(12) United States Patent
Terry

(10) Patent No.: US 7,180,885 B2
(45) Date of Patent: Feb. 20, 2007

(54) RECEIVING POINT-TO-POINT AND POINT-TO-POINT MULTIPOINT MULTIMEDIA BROADCASTS/MULTICAST SERVICES

(75) Inventor: Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 11/450,700

(22) Filed: Jun. 9, 2006

(65) Prior Publication Data

US 2006/0229082 A1 Oct. 12, 2006

Related U.S. Application Data

(63) Continuation of application No. 10/637,022, filed on Aug. 7, 2003.

(60) Provisional application No. 60/402,161, filed on Aug. 7, 2002.

(51) Int. Cl.
*H04J 3/00* (2006.01)

(52) U.S. Cl. ............... 370/338; 370/312; 370/432; 370/336

(58) Field of Classification Search ........... 370/335, 370/338, 328, 390, 391, 350, 342, 336, 473, 370/474, 477, 480, 312, 509–513; 455/450, 455/452.1, 452.2
See application file for complete search history.

(56) References Cited

U.S. PATENT DOCUMENTS 5,475,861 A 12/1995 Hall (Continued)

FOREIGN PATENT DOCUMENTS

CN 1340932 A 3/2002

(Continued)

OTHER PUBLICATIONS

Presentation of Specification to TSG or WG, TS 25.345, Version 2.0.0, RP-030309, TSG-RAN meeting #20, Hämeenlinna, Finland, $3^{rd}$ -$6^{th}$ (Jun. 2003).

(Continued)

*Primary Examiner*—Jean Gelin
(74) *Attorney, Agent, or Firm*—Volpe and Koenig, P.C.

(57) ABSTRACT

Receiving multimedia broadcasts/multicast services (MBMS) by a user equipment (UE) comprises when an MBMS service is transmitted as a point-to-point transmission, receiving information associated with the point-to-point transmission of a point-to-point MBMS service. Point-to-point MBMS segments of the point-to-point transmission are received over a dedicated traffic channel in response to the received point-to-point transmission information. When an MBMS service is transmitted as a point-to-multipoint transmission, receiving information associated with the point-to-multipoint transmission of a point-to-multipoint MBMS service. Point-to-multipoint MBMS segments of the point-to-multipoint transmission are received over secondary common control physical channels (S-CCPCHs) in response to the received point-to-multipoint transmission information. The S-CCPCHs originates from a plurality of cells and the transmission of the point-to-multipoint MBMS segments are not synchronized in time between the cells. The point-to-multipoint MBMS segments are reassembled.

6 Claims, 3 Drawing Sheets

U.S. PATENT DOCUMENTS

| | | |
|---|---|---|
| 5,592,471 A | 1/1997 | Briskman |
| 5,920,817 A | 7/1999 | Umeda et al. |
| 6,349,210 B1 | 2/2002 | Li |
| 6,760,303 B1 | 7/2004 | Brouwer |
| 6,795,419 B2 * | 9/2004 | Parantainen et al. ........ 370/337 |
| 2002/0085516 A1 | 7/2002 | Bridgelall |
| 2003/0012217 A1 | 1/2003 | Andersson et al. |
| 2003/0033253 A1 | 2/2003 | Rhodes |
| 2003/0073453 A1 | 4/2003 | Basilier |
| 2003/0096619 A1 | 5/2003 | Winberg |
| 2003/0207696 A1 | 11/2003 | Willenegger et al. |
| 2003/0223394 A1 | 12/2003 | Parantainen et al. |
| 2004/0081192 A1 * | 4/2004 | Koulakiotis et al. ........ 370/432 |
| 2004/0131075 A1 | 7/2004 | Sinnarajah et al. |
| 2005/0085182 A1 | 4/2005 | Chuberre et al. |

FOREIGN PATENT DOCUMENTS

| | | |
|---|---|---|
| KR | 2001-42426 | 5/2001 |
| KR | 2002025132 A | 4/2002 |
| RU | 2257674 | 7/2005 |
| RU | 2258311 | 8/2005 |
| RU | 2262196 | 10/2005 |
| RU | 2262811 | 10/2005 |
| WO | 01/99461 | 12/2001 |
| WO | 02/32178 A | 4/2002 |

OTHER PUBLICATIONS

3GPP TS 25.346 V2.0.0; Technical Specification Group Radio Access Network; Introduction of the Multimedia Broadcast Multicast Service (MBMS) in the Radio Access Network (Stage-2) (Release 6); 3$^{rd}$ Generation Partnership Project (Jun. 2003).

3GPP TS 25.cde V0.0.1; Technical Specification Group Radio Access Network; Introduction of the Multimedia Broadcast Multicast Service (MBMS) in RAN; (Release 6); 3$^{rd}$ Generation Partnership Project (May 2005).

* cited by examiner

RECEIVING POINT-TO-POINT AND POINT-TO-POINT MULTIPOINT MULTIMEDIA BROADCASTS/MULTICAST SERVICES

CROSS REFERENCE TO RELATED APPLICATION(S)

This application is a continuation of U.S. patent application Ser. No. 10/637,022 filed Aug. 7, 2003 which claims priority from U.S. Provisional Application No. 60/402,161 filed on Aug. 7, 2002, which is incorporated by reference as if fully set forth.

FIELD OF INVENTION

The present invention generally relates to wireless communication systems. In particular, the present invention relates to channel switching and scheduling of multimedia broadcasts and multicast services in such systems.

BACKGROUND

There is a growing desire to use multimedia broadcasts/multicast services (MBMS) in wireless communication systems. For a particular MBMS, a given cell in the network may have none, one or multiple users, wireless transmit/receive units (WTRUs), subscribed to that MBMS. As users migrate between cells, a cell that may originally have one or no users subscribed to the service may at a later point have multiple subscribed users. Conversely, a cell that may at one point have multiple subscribed users may at another time have only one or no users.

This migration of the users can create inefficient use of radio resource. If only one or a few users are subscribed to the MBMS in the cell, it may be desirable to support the service using dedicated channels to the users. The dedicated channels can utilize power control and beam steering to reduce the amount of radio resources utilized to support the MBMS.

However, if many users are subscribed to the MBMS in the cell, the multiple dedicated channels in total may use considerable radio resources. In such a situation, a more optimal use of the radio resources may be to send the MBMS data over a common/shared channel to a set of users subscribed to that MBMS. Although the use of beamsteering and power control in such situations is limited, the reduction in the number of total channels may reduce the used radio resources. As the number of MBMS users in the cell changes, an original choice of using either a common/shared channel or a dedicated channel may not be optimal at a later time.

Another potential problem resulting from user migration is MBMS scheduling. As a MBMS user moves between cells, that user needs to reconstruct the MBMS service from information received from both cells. If both cells synchronize their MBMS transmissions, the MBMS user can seamlessly move between the cells. However, such a scenario is typically not practical and undesirable. At certain time intervals based on the cell's loading and available resources, a cell may have more available resources to support the MBMS transmission than at another time. As a result, at that time, it is desirable for that cell to transmit a large amount of the MBMS data. For another cell at that same time interval, resources to support the same MBMS bandwidth may not be available. As a result, it may be desirable to schedule the MBMS transmissions differently between the cells, to better utilize such resources. As the MBMS user moves between cells, the new cell that the user has moved into may have transmissions either ahead or behind the other cell's transmissions. As a result, the MBMS user may miss MBMS data or needlessly receive redundant MBMS data.

Accordingly, it is desirable to have better resource utilization for MBMS.

SUMMARY

Receiving multimedia broadcasts/multicast services (MBMS) by a user equipment (UE) comprises when an MBMS service is transmitted as a point-to-point transmission, receiving information associated with the point-to-point transmission of a point-to-point MBMS service. Point-to-point MBMS segments of the point-to-point transmission are received over a dedicated traffic channel in response to the received point-to-point transmission information. When an MBMS service is transmitted as a point-to-multipoint transmission, receiving information associated with the point-to-multipoint transmission of a point-to-multipoint MBMS service. Point-to-multipoint MBMS segments of the point-to-multipoint transmission are received over secondary common control physical channels (S-CCPCHs) in response to the received point-to-multipoint transmission information. The S-CCPCHs originates from a plurality of cells and the transmission of the point-to-multipoint MBMS segments are not synchronized in time between the cells. The point-to-multipoint MBMS segments are reassembled.

BRIEF DESCRIPTION OF THE DRAWING(S)

DETAILED DESCRIPTION OF THE PREFERRED EMBODIMENT(S)

Although the preferred embodiments are described in conjunction with a third generation partnership program (3GPP) wideband code division multiple access (W-CDMA) system, the embodiments are applicable to any wireless system using MBMS. Hereafter, a wireless transmit/receive unit (WTRU) includes but is not limited to a user equipment, mobile station, fixed or mobile subscriber unit, pager, or any other type of device capable of operating in a wireless environment.

Figure 1:
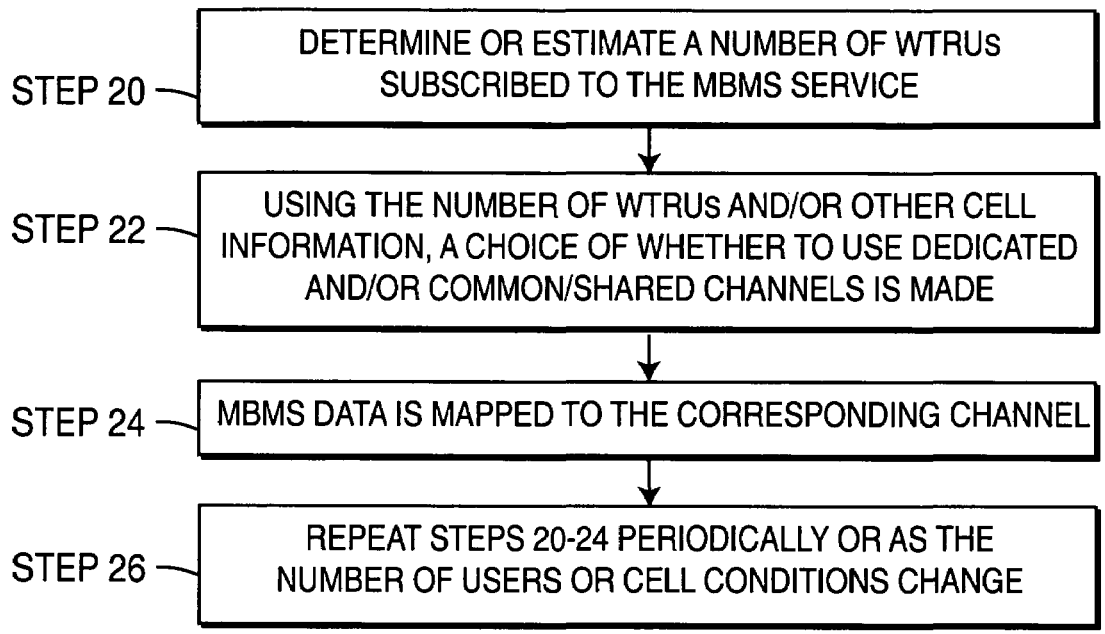
FIG. 1 is a flow chart for use in MBMS channel switching.

FIG. 1 is a flow chart for channel switching for a MBMS. In a particular cell, the number of WTRUs subscribed to the service is determined or estimated, step 20. Typically, this information is known. Using the number of WTRUs in the cell and/or other cell information, such as information on cell conditions, available cell resources, etc., a choice of whether dedicated channels, a common/shared channel or both are used, step 22. After the channel choice is made, the MBMS data is mapped to the corresponding channel(s), step 24. One possible approach to determine which type(s) of channels should be used is a threshold test. If below a certain threshold number of WTRUs is in the cell, dedicated channels are used. The dedicated channels allow for power control and transmit diversity techniques to be employed. These techniques are highly desirable when high data rate MBMS transfers are made, to efficiently use the available resources.

If the number of WTRUs exceeds the threshold, a common/shared channel is used, such as a shared channel, a high speed shared channel or a secondary common control physical channel (S-CCPCH). A shared channel or high speed shared channel can be used to transfer the MBMS data to multiple WTRUs simultaneously. The S-CCPCH can be used to broadcast the MBMS data to multiple users. Typically, the shared/common channels are less radio resource efficient.

In an alternate embodiment, a two threshold scheme may be used. If the number of MBMS subscribed WTRUs in the cell is below a first threshold, dedicated channels are used. If the number is between a first and second threshold, a shared or high speed shared channel is used. If the number exceeds the second threshold, a common channel is used to broadcast the MBMS.

Under certain circumstances, it may be desirable to use both shared and dedicated channels to support an MBMS. To illustrate, many subscribing WRTUs may be located together, such as at a train station, and a few or a single WTRU may be outside of the train station. In such a situation, the most efficient use of cell resources to support the MBMS may be to allocate a shared channel to the train station WTRUs and a dedicated channel to the other WTRU. As the number of users in a cell changes, the cell conditions changes or periodically, the channel choice is repeated using the new information, step 26.

Figure 2:
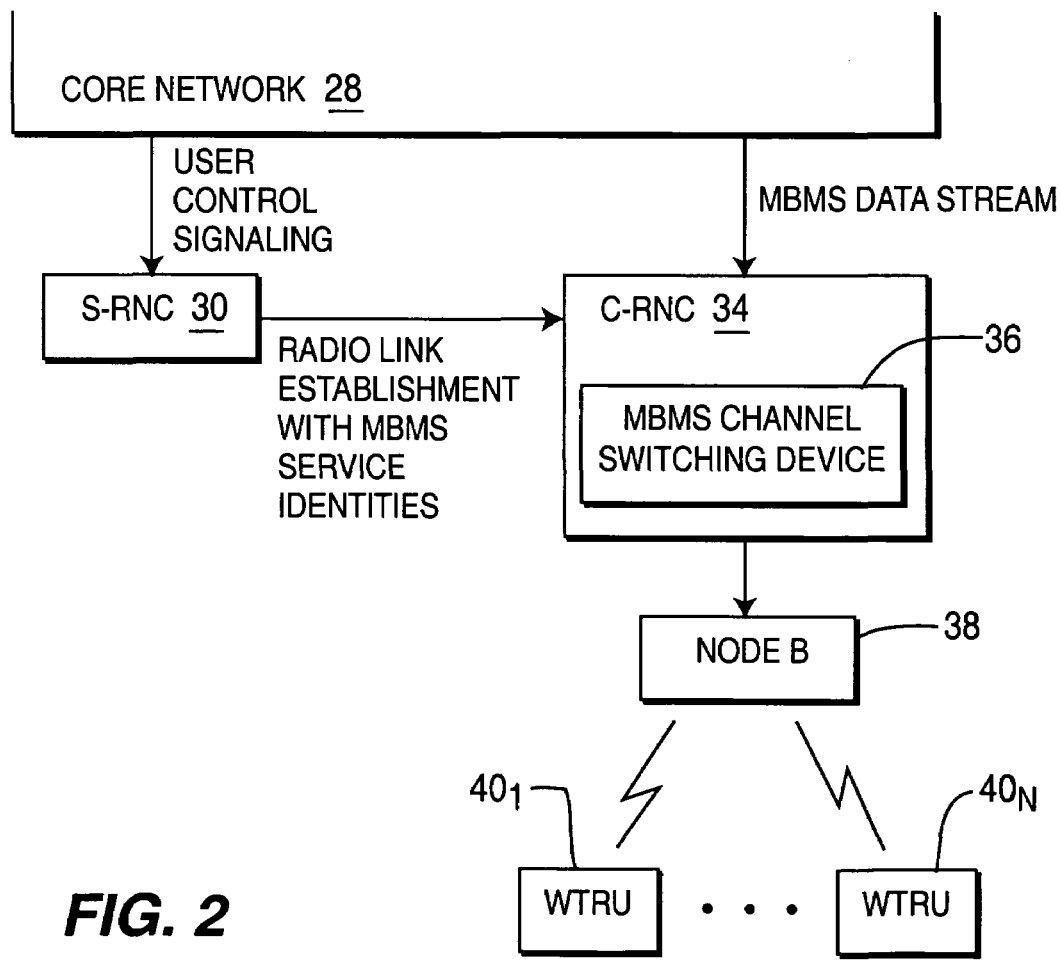
FIG. 2 is a radio access network using MBMS channel switching.

FIG. 2 is an illustration of a preferred radio access network (RAN) for performing channel switching. The RAN is managed by a serving radio network controller (S-RNC) 30 which manages the user's services and the controlling radio network controller (C-RNC) 34 which manages the physical resources of the cells. Signaling procedures which provide the coordination needed between the S-RNCs 30 and the C-RNCs 34 for proper operation of the RAN are utilized.

A channel switching entity (MBMS channel switching device 36) determines which channels to use, such as dedicated, shared or the common, for MBMS transmission and it also coordinates reception of the MBMS with the WTRUs 40₁ to 40_N (40). The MBMS data is sent to the WTRUs 40 via the Node-B 38.

A preferred implementation of the channel switching is as follows. A first WTRU 40 subscribed to the MBMS can enter and exit cells autonomously with respect to the activation and distribution of the MBMS service. When the MBMS is first established for the first WTRU 40 or a small number of users within a particular cell, dedicated channels are established with a unique radio link (RL) indicator that identifies the MBMS service. A second WTRU 40 that wishes to utilize another MBMS will have a different dedicated channel assigned to that user. When the RL is established for each user, a unique MBMS indicator is signaled from the S-RNC 30 to the C-RNC 34. This MBMS indicator is unique to each service provided to the user. The C-RNC 34 maintains a database of all users currently active for a particular MBMS service and this group is known as the MBMS user group.

The data for each active MBMS service is distributed to the C-RNC 34 from the core network 28 via the MBMS data stream. A unique identifier is associated with each MBMS data stream allowing the C-RNC 34 to associate the data with the appropriate user or user group so the data can be properly routed. Depending on the number of active users for a particular MBMS service and cell conditions, the C-RNC 34 will determine if the service should be transmitted on dedicated or shared/common channels.

Since individual users autonomously enter and exit the cell, the switching between dedicated and common channels is dynamic and may occur during ongoing transmissions. Dynamic switching can be applied to the downlink shared channels (DSCH). Data can be sent on the DSCH to be received by a single user is referred to as dedicated DSCH (D-DSCH) or by multiple users simultaneously is referred to as common DSCH (C-DSCH). For a particular MBMS when there is only one user or a small number of users existing within the cell, the DSCH will be a D-DSCH to the user or users. When the number of users associated with a particular MBMS increases, a C-DSCH can be established for this MBMS user group.

When the first WTRU 40 becomes active within the cell, a D-DSCH is established to this first user. The MBMS transmission may not necessarily be continuously active. The transmission of the MBMS on the DSCH is indicated to the first WTRU 40 on an associated dedicated channel. This indication may be turned on and off on a transmission time interval (TTI) basis.

The C-DSCH may be physically identical to the D-DSCH. However, a distinguishing characteristic is that the signaling for the DSCH transmission for the individual user associated with a dedicated channel within the MBMS user group is that the transmission is synchronized. This allows all users in the MBMS user group to receive the common DSCH transmission. An indication may be signaled along with MBMS transmissions to indicate that the MBMS transmission is either dedicated to a particular user or common to the users in the MBMS user group. This allows for proper operation of power control techniques, transmit diversity or any other unique physical transmission attributes. The MBMS transitions between dedicated and common DSCH is preferably transparent to the WTRU 40.

In another embodiment, the channel switching is applied to the high speed DSCH (HS-DSCH). A difference between using the HS-DSCH instead of the DSCH is that rather than applying synchronized allocations in the C-RNC 34 on the associated dedicated channels, the synchronized allocations are provided on HS-DSCH control channels in Node-B 38.

In another embodiment, switching may be performed between the dedicated physical channels and common physical channels without the use of the associated dedicated channels. The channel switching between the dedicated channels to the common channels is explicitly signaled to each user. The RAN layer 3 protocols allow for procedures of signaling the radio frame to transition between the dedicated and the common channels. The signaling is performed by either signaling a radio frame for the transition or by signaling the transmission scheduling information.

Figure 3:
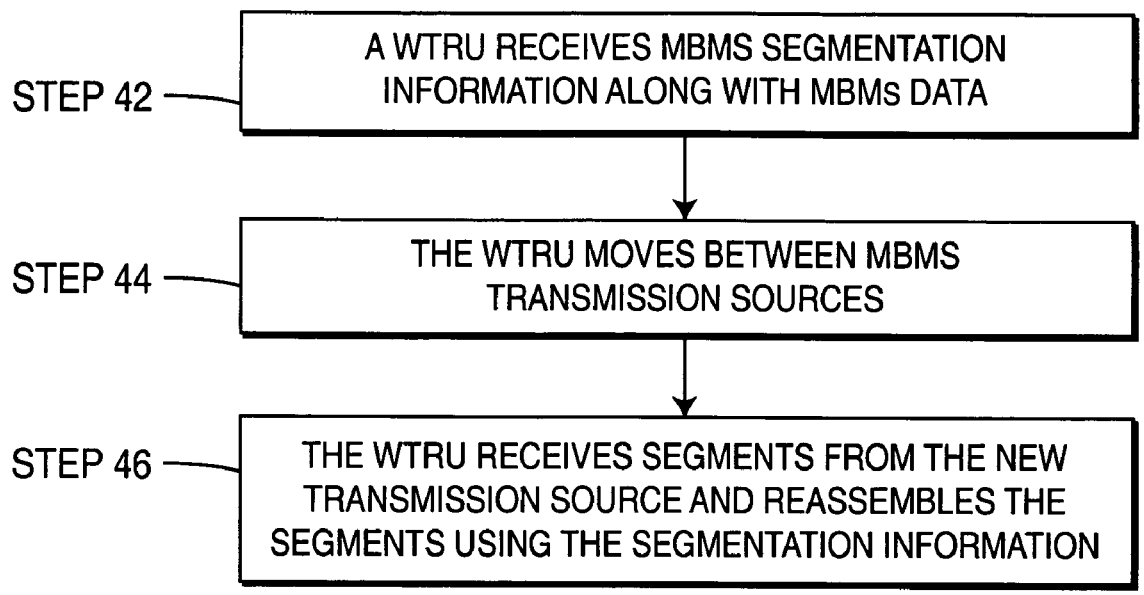
FIG. 3 is a flow chart for coordinating reception of a MSMS transmission from multiple sources using in band segmentation information.
Figure 4:
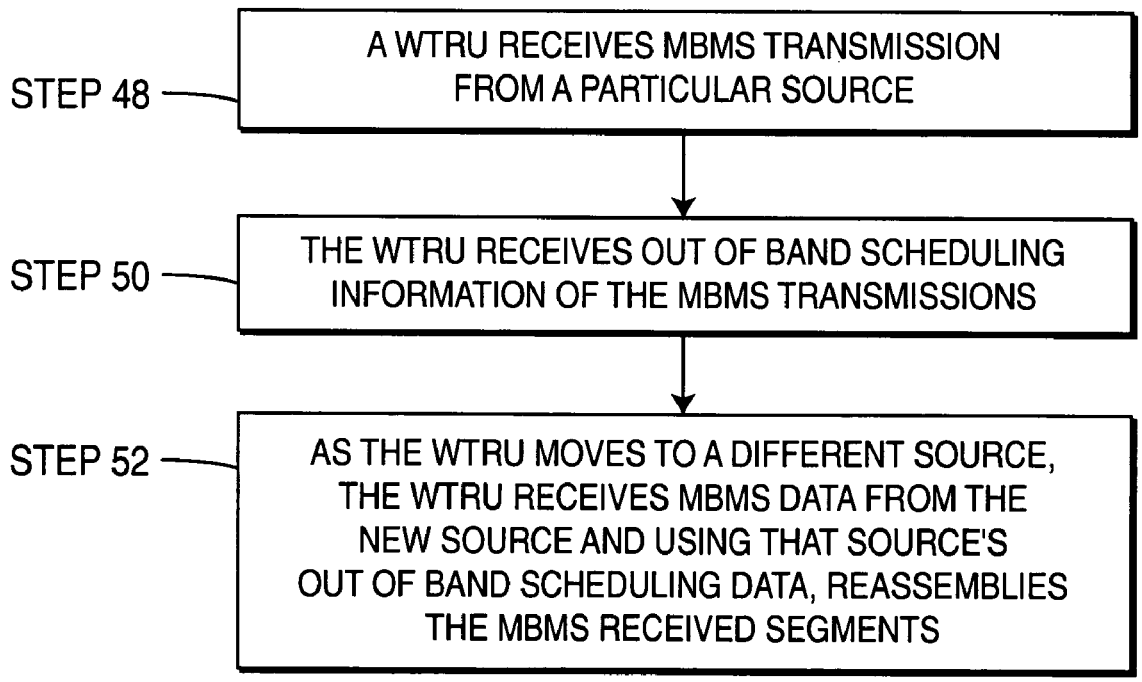
FIG. 4 is a flow chart for coordinating reception of a MSMS transmission from multiple sources using out of band segmentation information.

FIGS. 3 and 4 are flow charts to allow for different cells and different inter-cell MBMS transmissions to be scheduled in different orders. To illustrate, a first cell may be able to transmit large amounts of MBMS data to WTRUs 40 in a radio frame that a second cell can not. As a result, MBMS transmission in the first cell may be one or multiple radio frames or TTIs ahead of the second cell.

To illustrate for inter-cell, within a cell, one group of users may be located in a train station and serviced by a common DSCH and another user within the same cell may be outside of the train station and be serviced by a dedicated channel or dedicated DSCH to take full advantage of beam forming and power control. Based on the DSCH loading and other factors, it may be desirable for transmissions to the train station WTRUs 40 to either lead or lag the outside WTRU transmissions. If a user of the outside WTRU 40 goes to the train station, it would most likely be desirable to switch that WTRU 40 to the common DSCH and disestablish the dedicated channel. In this scenario, the outside WTRU 40 may need to catch up to the transmissions on the common DSCH or allow those transmissions to catch up to the segments that the WTRU 40 already received.

To maintain continuous service distribution and make more efficient use of radio resources, the MBMS transmissions are preferably either segmented or scheduled so that users can receive elements of an MBMS service transmission in any order. As a result, the MBMS service transmissions do not have to be reinitiated in a cell upon a user entry to that cell or the user does not have to wait to synchronize with an existing MBMS service transmission.

FIG. 3 is a flow chart for using in-band segmentation information to handle differing MBMS transmission orders either inter-cell or between cells. Along with the MBMS transmissions, segmentation information is sent along with the MBMS data, step 42. This segmentation information typically includes a segment identifier so that each receiving WTRU is aware of which segments that it has received. As a particular WTRU moves between MBMS transmission sources (between cells or switched channels), step 44, the WTRU can receive segments from the new MBMS source and reassemble the transmissions to recovery all the MBMS data, step 46.

Figure 5:
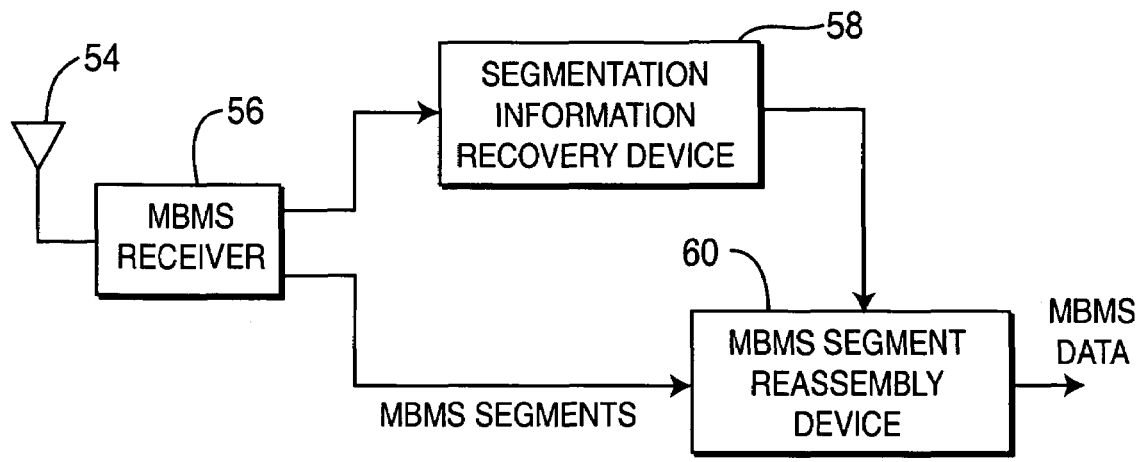
FIG. 5 is a WTRU for receiving MBMS information using in band segmentation information.

FIG. 5 is a simplified block diagram of a WTRU 40 for receiving the differing MBMS transmissions. The WTRU 40 receives the MBMS transmissions using an antenna 54. A MBMS receiver 56 receives the MBMS transmissions from the differing transmission sources, including the in band segmentation information. A segmentation information recovery device 58 recovers the segmentation information. Using the segmentation information and received MBMS segments, a MBMS segmentation reassembly device 60 reassembles the segments to recover the MBMS data.

FIG. 4 is a flow chart for using out of band transmission scheduling information to handle differing MBMS transmission orders. A WTRU receives a MBMS transmission from a particular source, step 48. The WTRU also receives out of band scheduling information, step 50. As the WTRU moves to a different source, the WTRU can receive MBMS data from the new source and using that source's out of band scheduling data reassemble the MBMS received segments, step 52.

Figure 6:
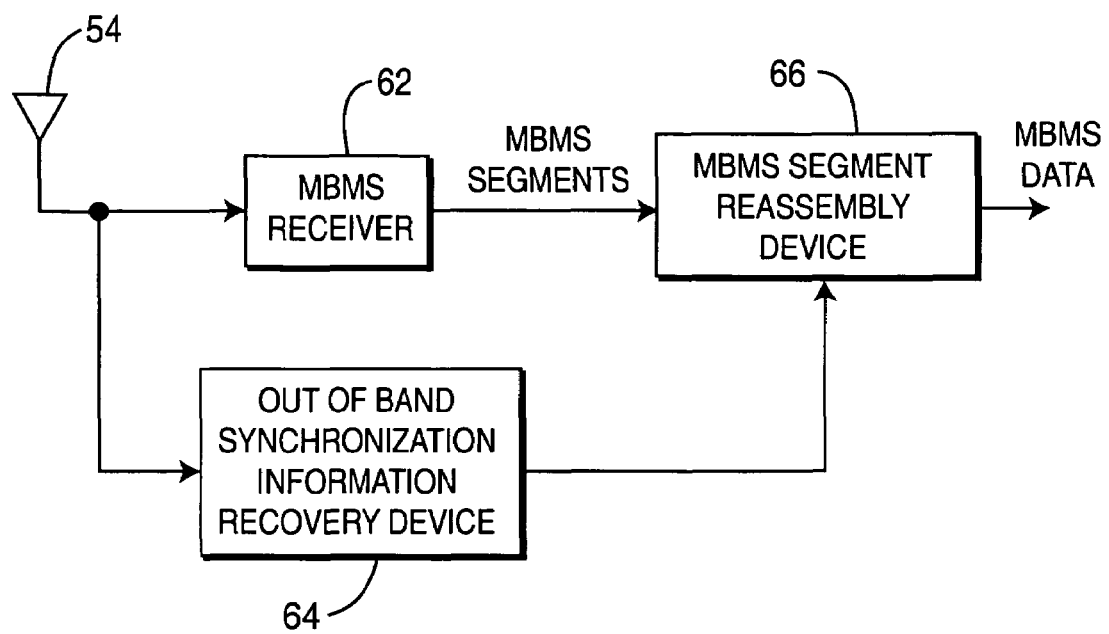
FIG. 6 is a WTRU for receiving MBMS information using out of band synchronization information.
Figure 3:
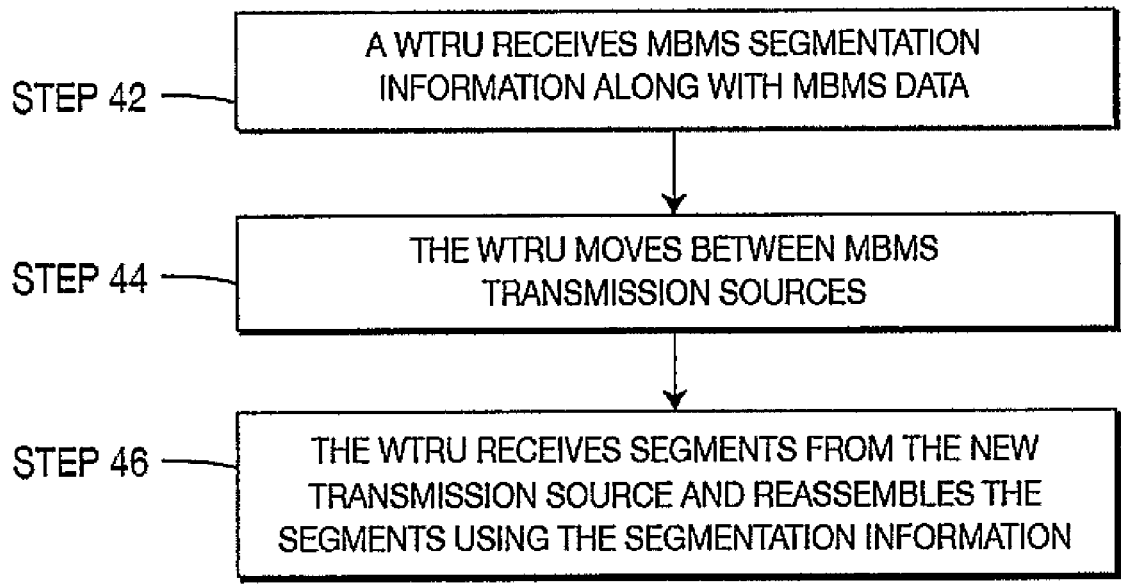

FIG. 6 is a simplified block diagram of a WTRU 40 for receiving the differing MBMS transmissions. The WTRU 40 receives the MBMS transmissions using an antenna 54. A MBMS receiver 64 receives the MBMS transmissions from the differing transmission sources. An out of band synchronization information device 62 receives synchronization information from the multiple transmission sources. Using the synchronization information and received MBMS segments, a MBMS segmentation reassembly device 66 reassembles the segments to recover the MBMS data.

Both the approaches of FIGS. 3 and 4 allow for users existing within the cell to just transition between dedicated and common channels without interruption or delay in the MBMS transmission. Additionally, WTRUs entering the cell can maintain continuous reception of the MBMS service, even though the sequence of transmission between the new and old cell are different. Once MBMS transmission data is received the WTRU reorders the information according to the in band segmentation and/or out of band transmission scheduling information.

Since either in band segmentation or out of band scheduling is provided, lost or failed transmissions can be efficiently recovered by the WTRU's knowledge of when retransmission is expected. The RNC MBMS retransmission scheduling can also be reduced by taking into account intelligent reception by the WTRUs. To illustrate, if the RNC knows all the users have received a particular MBMS segment, retransmission of that segment can be prevented.

What is claimed is:

1. A wideband code division multiple access (W-CDMA) user equipment (UE) for receiving multimedia broadcasts/multicast services (MBMS), the UE comprising:

an MBMS receiver configured to receive information associated with a point-to-point transmission of a point-to-point MBMS service, the received point-to-point transmission information including a point-to-point MBMS identity associated with the point-to-point MBMS service;

the MBMS receiver configured to receive point-to-point MBMS segments over a dedicated traffic channel of the point-to-point transmission in response to the received point-to-point transmission information;

the MBMS receiver configured to receive information associated with a point-to-multipoint transmission of a point-to-multipoint MBMS service, the received point-to-multipoint transmission information including a point-to-multipoint MBMS identity associated with the point-to-multipoint MBMS service;

the MBMS receiver configured to receive point-to-multipoint MBMS segments over secondary common control physical channels (S-CCPCHs) of the point-to-multipoint transmission in response to the received point-to-multipoint transmission information, the S-CCPCHs originating from a plurality of cells and the transmission of the point-to-multipoint MBMS segments are not synchronized in time between the cells;

an MBMS segment reassembly device configured to reassemble the point-to-multipoint MBMS segments.

2. The UE of claim 1 wherein segmentation information is received in-band with the point-to-multipoint segments and the MBMS reassembly device reassembles the point-to-multipoint segments is in response to the MBMS segments.

3. The UE of claim 1 wherein the MBMS receiver configured to receive segments of a same MBMS service when the MBMS service is transmitted in a first transmission time interval (TTI) as the point-to-point transmission and the same MBMS service is transmitted in a second TTI as the point-to-multipoint transmission.

4. A method for receiving multimedia broadcasts/multicast services (MBMS) by a wideband code division multiple access (W-CDMA) user equipment (UE), the method comprising:

when an MBMS service is transmitted as a point-to-point transmission:

receiving information associated with the point-to-point transmission of a point-to-point MBMS service, the received point-to-point transmission information including a point-to-point MBMS identity associated with the point-to-point MBMS service; and receiving point-to-point MBMS segments of the point-to-point transmission over a dedicated traffic channel in response to the received point-to-point transmission information; and when an MBMS service is transmitted as a point-to-multipoint transmission:

receiving information associated with the point-to-multipoint transmission of a point-to-multipoint MBMS service, the received point-to-multipoint transmission information including a point-to-multipoint MBMS identity associated with the point-to-multipoint MBMS service;

receiving point-to-multipoint MBMS segments of the point-to-multipoint transmission over secondary common control physical channels (S-CCPCHs) in response to the received point-to-multipoint transmission information, the S-CCPCHs originating from a plurality of cells and the transmission of the point-to-multipoint MBMS segments are not synchronized in time between the cells; and reassembling the point-to-multipoint MBMS segments.

5. The method of claim 4 wherein segmentation information is transmitted in-band with the point-to-multipoint segments and the reassembling the point-to-multipoint segments is in response to the MBMS segments.

6. The method of claim 4 wherein a same MBMS service is transmitted in a first transmission time interval (TTI) as the point-to-point transmission and the same MBMS service is transmitted in a second TTI as the point-to-multipoint transmission.

* * * * *

UNITED STATES PATENT AND TRADEMARK OFFICE
CERTIFICATE OF CORRECTION

| | | |
|---|---|---|
| PATENT NO. | : 7,180,885 B2 | |
| APPLICATION NO. | : 11/450700 | |
| DATED | : February 20, 2007 | |
| INVENTOR(S) | : Stephen E. Terry | |

It is certified that error appears in the above-identified patent and that said Letters Patent is hereby corrected as shown below:

The title page should be deleted and substitute therefor the attached title page as shown on the attached page

United States Patent
Terry

(12) United States Patent
(10) Patent No.: US 7,180,885 B2
(45) Date of Patent: Feb. 20, 2007

(54) RECEIVING POINT-TO-POINT AND POINT-TO-POINT MULTIPOINT MULTIMEDIA BROADCASTS/MULTICAST SERVICES

(75) Inventor: Stephen E. Terry, Northport, NY (US)

(73) Assignee: InterDigital Technology Corporation, Wilmington, DE (US)

(*) Notice: Subject to any disclaimer, the term of this patent is extended or adjusted under 35 U.S.C. 154(b) by 0 days.

(21) Appl. No.: 11/450,700

(22) Filed: Jun. 9, 2006

(65) Prior Publication Data
US 2006/0229082 A1    Oct. 12, 2006

Related U.S. Application Data

(63) Continuation of application No. 10/637,022, filed on Aug. 7, 2003.

(60) Provisional application No. 60/402,161, filed on Aug. 7, 2002.

(51) Int. Cl.
H04J 3/00 (2006.01)

(52) U.S. Cl. .................. 370/338; 370/312; 370/432; 370/336

(58) Field of Classification Search ................ 370/335, 370/338, 328, 390, 391, 350, 342, 336, 473, 370/474, 477, 480, 312, 509–513; 455/450, 455/452.1, 452.2
See application file for complete search history.

(56) References Cited

U.S. PATENT DOCUMENTS 5,475,861 A    12/1995    Hall (Continued)

FOREIGN PATENT DOCUMENTS

CN    1340932 A    3/2002

(Continued)

OTHER PUBLICATIONS

Presentation of Specification to TSG or WG, TS 25.345, Version 2.0.0, RP-030309, TSG-RAN meeting #20, Hämeenlinna, Finland, 3rd -6th (Jun. 2003).

(Continued)

Primary Examiner—Jean Gelin
(74) Attorney, Agent, or Firm—Volpe and Koenig, P.C.

(57) ABSTRACT

Receiving multimedia broadcasts/multicast services (MBMS) by a user equipment (UE) comprises when an MBMS service is transmitted as a point-to-point transmission, receiving information associated with the point-to-point transmission of a point-to-point MBMS service. Point-to-point MBMS segments of the point-to-point transmission are received over a dedicated traffic channel in response to the received point-to-point transmission information. When an MBMS service is transmitted as a point-to-multipoint transmission, receiving information associated with the point-to-multipoint transmission of a point-to-multipoint MBMS service. Point-to-multipoint MBMS segments of the point-to-multipoint transmission are received over secondary common control physical channels (S-CCPCHs) in response to the received point-to-multipoint transmission information. The S-CCPCHs originates from a plurality of cells and the transmission of the point-to-multipoint MBMS segments are not synchronized in time between the cells. The point-to-multipoint MBMS segments are reassembled.

6 Claims, 3 Drawing Sheets

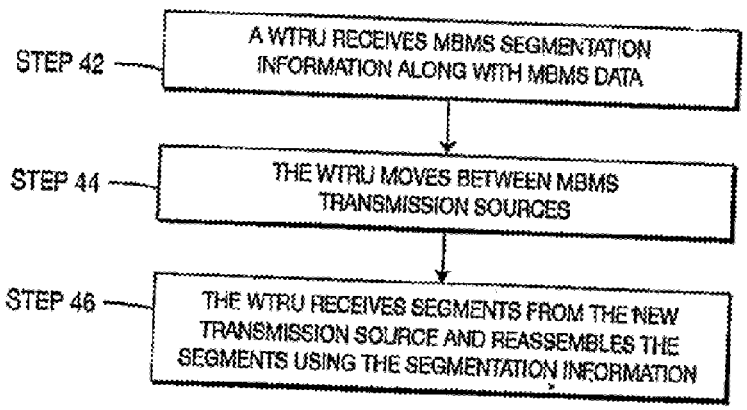

UNITED STATES PATENT AND TRADEMARK OFFICE
CERTIFICATE OF CORRECTION

| | | |
|---|---|---|
| PATENT NO. | : 7,180,885 B2 | |
| APPLICATION NO. | : 11/450700 | |
| DATED | : February 20, 2007 | |
| INVENTOR(S) | : Stephen E. Terry | |

It is certified that error appears in the above-identified patent and that said Letters Patent is hereby corrected as shown below:

ON THE TITLE PAGE

At section (54), Title, page 1, left column, line 2, delete "POINT-TO-POINT MULTIPOINT", and insert therefor --POINT-TO-MULTIPOINT--.

At section (56), FOREIGN PATENT DOCUMENTS, page 2, left column, before "KR 2001-42426  5/2001", insert
--JP    11-041186  2/1999
  JP  2000-138966  5/2000
  JP  2002-165262  6/2002
  JP  2002-259807  9/2002
  JP  2003-069491  3/2003--.

Title page, item (57), ABSTRACT, page 1, right column, line 16, after "S-CCPCHs", delete "originates" and insert therefor --originate--.

At column 1, line 2, delete "POINT-TO-POINT MULTIPOINT", and insert therefor --POINT-TO-MULTIPOINT--.

At column 2, line 22, after the word "service", delete ". Point" and insert therefor --, point--.

At column 2, line 26, after "S-CCPCHs", delete "originates" and insert therefor --originate--.

At column 3, line 3, before the words "in the cell", delete "is" and insert therefor --are--.

At column 3, line 9, after "WTRUs", delete "exceeds" and insert therefor --exceed--.

At column 3, line 20, after the word "cell", delete "is" and insert therefor --are--.

At column 3, line 34, before the words "or periodically", delete "changes" and insert therefor --change--.

At column 4, line 13, after the word "user", insert --and--.

UNITED STATES PATENT AND TRADEMARK OFFICE
CERTIFICATE OF CORRECTION

PATENT NO. : 7,180,885 B2
APPLICATION NO. : 11/450700
DATED : February 20, 2007
INVENTOR(S) : Stephen E. Terry It is certified that error appears in the above-identified patent and that said Letters Patent is hereby corrected as shown below:

At column 4, line 14, after the word "simultaneously", insert --and--.

Signed and Sealed this

Eleventh Day of December, 2007

JON W. DUDAS
*Director of the United States Patent and Trademark Office*